US006933036B2

(12) United States Patent
Whitaker

(10) Patent No.: US 6,933,036 B2
(45) Date of Patent: Aug. 23, 2005

(54) NON-SKID FLOOR MAT DESIGN

(75) Inventor: Jessie G. Whitaker, Martinez, GA (US)

(73) Assignee: Textron Inc., Providence, RI (US)

( * ) Notice: Subject to any disclaimer, the term of this patent is extended or adjusted under 35 U.S.C. 154(b) by 0 days.

(21) Appl. No.: 10/193,667

(22) Filed: Jul. 11, 2002

(65) Prior Publication Data

US 2004/0009329 A1 Jan. 15, 2004

(51) Int. Cl.[7] .............................. D06N 7/04; B32B 3/00; A47L 13/10
(52) U.S. Cl. ........................ 428/141; 428/156; 428/172; D12/203; 15/215
(58) Field of Search ................................ 428/141, 172, 428/88, 138, 120, 372

(56) References Cited

U.S. PATENT DOCUMENTS

| | | | |
|---|---|---|---|
| 4,031,767 A | 6/1977 | Guyer | 74/231 |
| 4,034,617 A | 7/1977 | Guyer | 74/231 |
| 4,122,225 A | 10/1978 | Holmstrom et al. | 428/172 |
| 4,255,137 A | 3/1981 | Guyer | 432/225 |
| 4,260,534 A | 4/1981 | Hanson et al. | 260/31.8 R |
| 4,312,686 A | 1/1982 | Smith et al. | 156/209 |
| 4,377,610 A | 3/1983 | McClung, Jr. | 428/88 |
| 4,379,185 A | 4/1983 | Smith et al. | 427/209 |
| 4,490,069 A | 12/1984 | Cushman et al. | 404/15 |
| 4,496,414 A | 1/1985 | Smith et al. | 156/246 |
| 4,513,991 A * | 4/1985 | Renaud | 283/117 |
| 4,587,148 A | 5/1986 | Campbell et al. | 428/88 |
| 4,612,074 A | 9/1986 | Smith et al. | 156/85 |
| 4,620,816 A | 11/1986 | Kupfer | 404/6 |
| 4,678,528 A | 7/1987 | Smith et al. | 156/220 |
| 4,715,743 A | 12/1987 | Schmanski | 404/9 |
| 4,773,959 A | 9/1988 | Smith et al. | 156/351 |
| 4,824,063 A | 4/1989 | Miller | 248/346 |
| 5,084,599 A * | 1/1992 | Libit | 200/61.89 |
| 5,122,212 A | 6/1992 | Ferguson et al. | 156/209 |
| 5,204,159 A | 4/1993 | Tan | 428/43 |
| 5,303,669 A * | 4/1994 | Szekely | 116/205 |
| 5,304,272 A | 4/1994 | Rohrbacker et al. | 156/209 |
| 5,416,958 A | 5/1995 | Lilly et al. | 26/29 R |
| 5,429,854 A | 7/1995 | Currie et al. | 428/138 |
| 5,461,748 A | 10/1995 | Koiduka | 15/161 |
| 5,490,821 A | 2/1996 | Wu | 601/134 |
| 5,554,333 A * | 9/1996 | Fujiki | 264/284 |
| 5,597,135 A | 1/1997 | Vandersteene | 242/599.4 |
| 5,776,583 A | 7/1998 | Peyton | 428/120 |
| 5,787,655 A | 8/1998 | Saylor, Jr. | 52/181 |
| 5,830,572 A | 11/1998 | Anton et al. | 428/372 |
| 5,891,546 A | 4/1999 | Sherman | 428/88 |
| 5,930,967 A | 8/1999 | Stoehr et al. | 52/403.1 |
| 5,972,462 A | 10/1999 | Sutherland et al. | 428/88 |
| 5,993,936 A | 11/1999 | Gardner | 428/131 |
| 6,001,493 A | 12/1999 | Rutledge et al. | 428/620 |
| 6,023,900 A | 2/2000 | Stoehr et al. | 52/403.1 |
| 6,050,223 A | 4/2000 | Harris | 119/165 |
| 6,127,015 A | 10/2000 | Kessler | 428/45 |

(Continued)

FOREIGN PATENT DOCUMENTS

| | | |
|---|---|---|
| JP | 11078647 | 3/1999 |
| JP | 2000185585 | 7/2000 |
| JP | 2001047924 | 2/2001 |

*Primary Examiner*—Harold Pyon
*Assistant Examiner*—Patricia L. Nordmeyer
(74) *Attorney, Agent, or Firm*—Harness, Dickey & Pierce, P.L.C.

(57) ABSTRACT

A non-skid floor mat for use in a golf car is provided to enable traction with one of a hard spike and a soft spike of a golf shoe. The non-skid floor mat includes a sheet of elastomeric material and nibs in the wall area of the mat. The nibs are sufficiently spaced from one another to enable one of direct contact of the hard spike with the sheet and contact of the soft spike with both the nibs and the sheet. Preferably, the nibs have a height between 0.12 and 0.19 inches, and are offset from one another by a center to center distance of between 0.5 and 0.8 inches.

31 Claims, 3 Drawing Sheets

U.S. PATENT DOCUMENTS

| | | |
|---|---|---|
| 6,146,588 A | 11/2000 | Deighton .................... 422/28 |
| 6,148,577 A | 11/2000 | Smolenski et al. ........... 52/469 |
| 6,155,629 A | 12/2000 | Sherman ................. 296/97.23 |
| 6,162,748 A | 12/2000 | Schilling et al. ............ 442/226 |
| 6,170,212 B1 | 1/2001 | Suchyna et al. .............. 52/480 |
| 6,173,528 B1 | 1/2001 | Motz et al. .................. 47/58.1 |
| 6,177,164 B1 | 1/2001 | Sullens et al. ............. 428/40.1 |
| 6,186,379 B1 | 2/2001 | Haage et al. ............ 224/42.33 |
| 6,509,084 B2 * | 1/2003 | Sturtevant et al. .......... 428/141 |
| 6,610,382 B1 * | 8/2003 | Kobe et al. ................. 428/119 |

\* cited by examiner

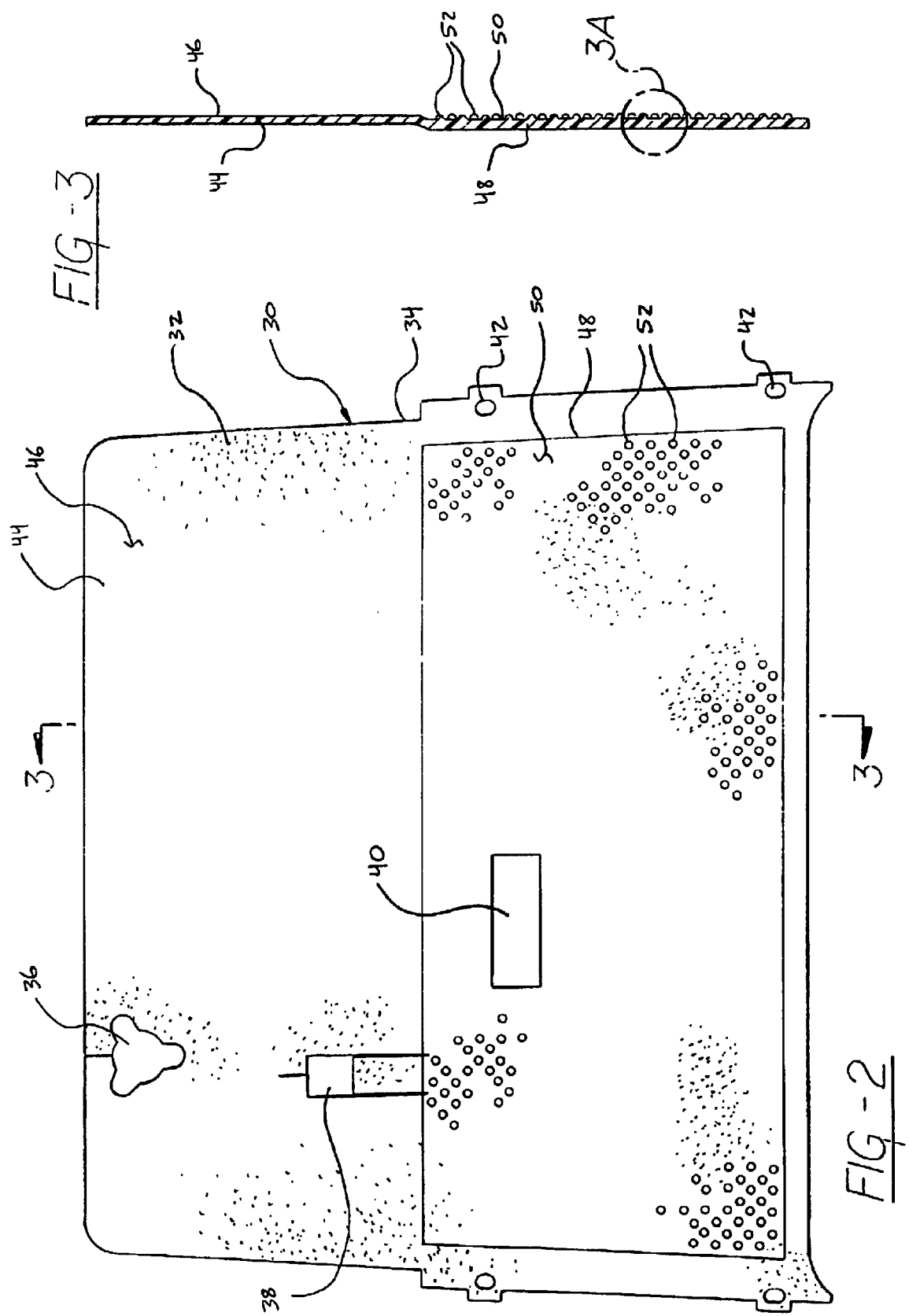

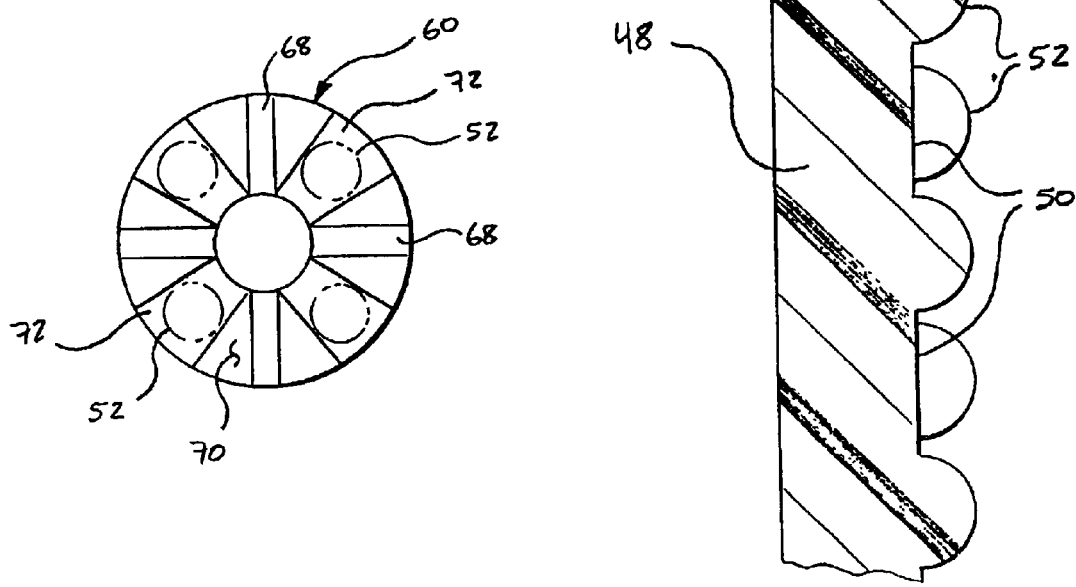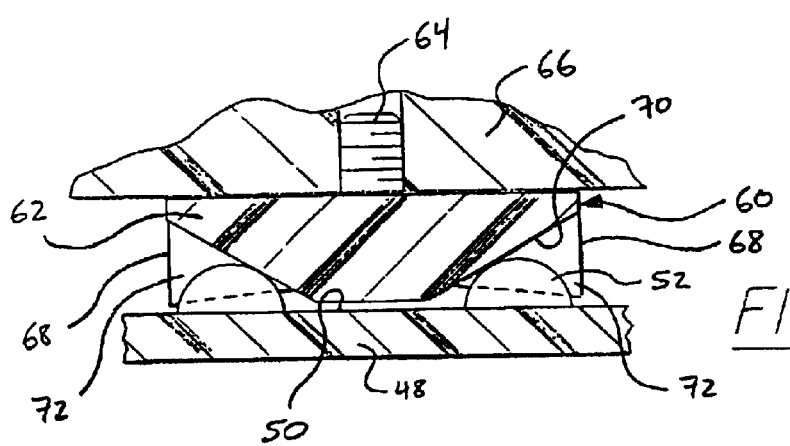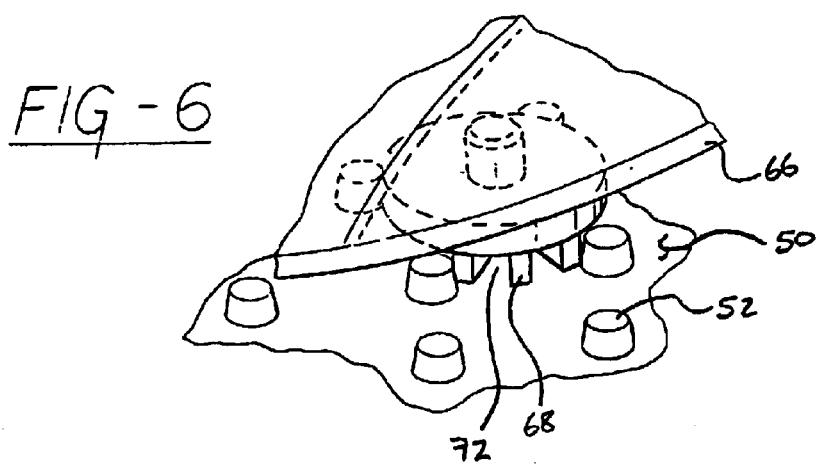

NON-SKID FLOOR MAT DESIGN

FIELD OF THE INVENTION

The present invention relates generally to floor mats and more particularly to a non-skid floor mat design for use in a golf car.

BACKGROUND OF THE INVENTION

Traditionally, the passenger compartment of a golf car includes a floor mat designed to provide a comfortable non-skid surface of the floor for occupants wearing hard spiked golf shoes (steel, ceramic, etc.). Typical designs include a moderately hard rubber compound with a rough surface texture similar to indoor/outdoor carpeting. The majority of the non-skid function results from the hard spikes of the golf shoes embedding into the mat material. Thus, the properties of the material are focused on wear resistance to provide adequate service life of the mat. The surface texture of traditional mats must remain shallow to preclude a tripping hazard with aggressive hard spikes. The shallow surface texture also limits the entrapment of dirt in the mat surface, facilitating easy cleaning.

In recent years, there has been a dramatic shift from hard spiked golf shoes to shoes incorporating soft spikes. Soft spikes are typically made from a plastic compound, are significantly more pliable and less abusive than hard spikes. The benefit of soft spikes to a course operator is reduced damage to both the playing surface, putting greens in particular, and the course facilities, floors, steps, sidewalks and the like. The benefits of soft spikes to the golfer include comfortable walking and more consistent putting as a result of the reduced damage to the putting greens.

The shift to using soft spiked golf shoes has created a heightened need for the floor mat of the golf car to provide an improved non-skid surface. Additionally, the plastics from which the soft spikes are molded, are typically slippery when contacting the floor mat material, especially when wet. Further, hard spikes and soft spikes are used contemporaneously, as not all players have switched to soft spikes. Thus, the floor mat must provide additional non-skid capability for soft spikes, without being overly aggressive for hard spikes, while still providing adequate service life and cleaning characteristics.

SUMMARY OF THE INVENTION

Accordingly, the present invention provides a non-skid floor mat for use in a golf car to enable traction with one of a hard spike and a soft spike of a golf shoe. The non-skid floor mat includes a sheet having a first section and a second section, and a plurality of nibs protruding from the second section. The nibs are sufficiently spaced from one another to enable one of direct contact of the hard spike with the sheet and contact of the soft spike with both the nibs and the sheet. Optionally, either the first or second section can include a textured surface. The textured surface of the second section lies between each of the plurality of nibs.

The nibs have a height within the range of 0.12 to 0.19 inches and are separated by a center-to-center distance of at least 0.5 inches.

Further, the floor mat is comprised of an elastomeric material.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a plan view of the non-skid floor mat;

FIG. 3 is a cross-sectional view of the non-skid floor mat along line 3—3 of FIG. 2;

FIG. 3A is a detailed view of a portion of the cross-section of FIG. 3;

FIG. 4 is a bottom view of a typical soft spike;

FIG. 5 is a cross-sectional side view of a typical soft spike engaging the non-skid floor mat; and FIG. 6 is a perspective view of a typical soft spike engaging the non-skid floor mat.

DETAILED DESCRIPTION OF THE PREFERRED EMBODIMENTS

Figure 1:
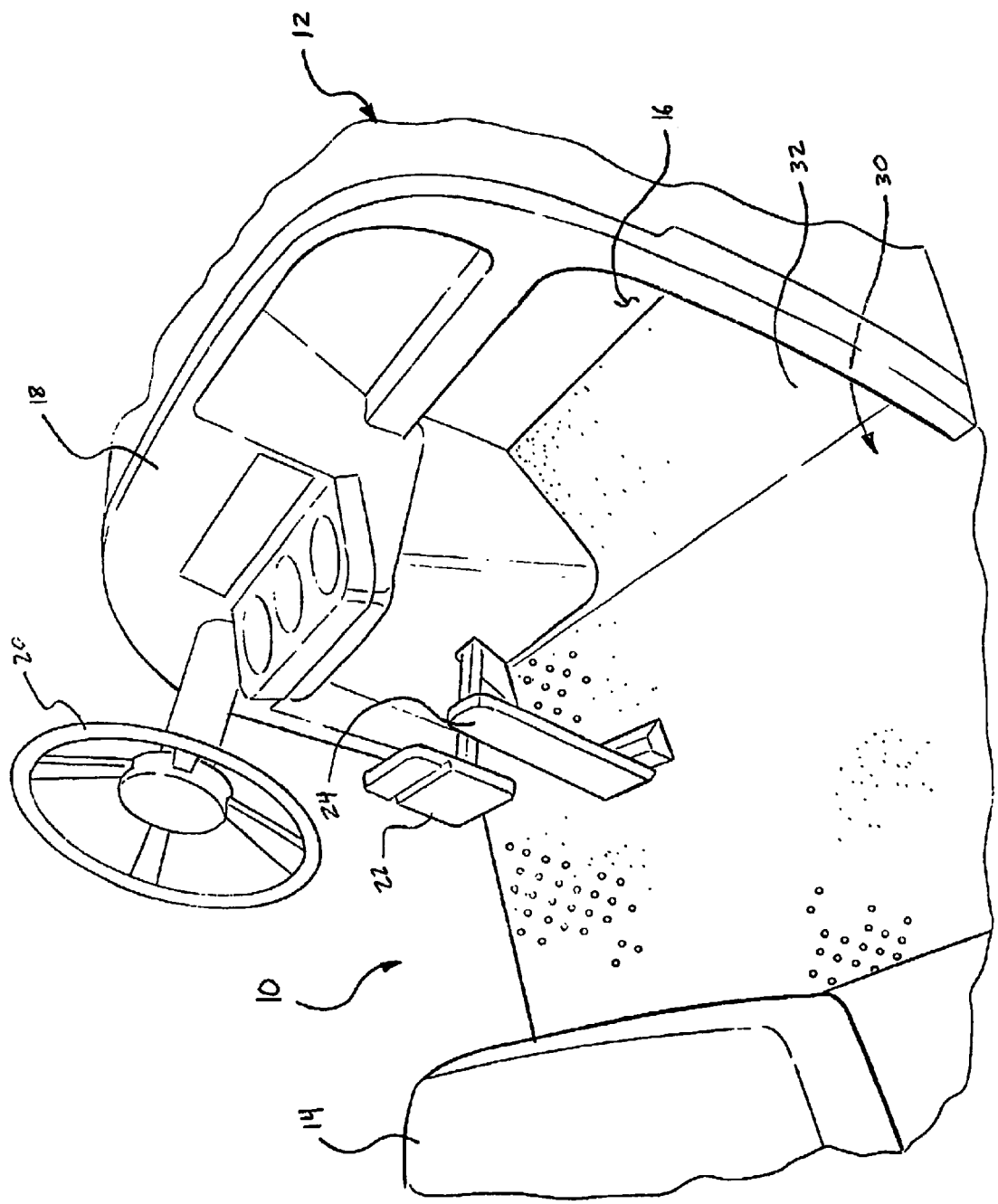
FIG. 1 is a perspective view of a passenger compartment of a golf car including a non-skid floor mat in accordance with the principles of the present invention.

The following description of the preferred embodiment is merely exemplary in nature and is in no way intended to limit the invention, its application, or uses.

Referencing FIG. 1, a passenger compartment 10 of a golf car 12 is shown. The passenger compartment 10 includes a seat 14, a floor 16, and a dash panel 18, steering wheel 20, a brake pedal 22, and an accelerator pedal 24. A non-skid floor mat 30, designed in accordance with the principles of the present invention, covers the floor 16 of the passenger compartment 10.

With particular reference to FIGS. 2, 3 and 3A, the non-skid floor mat 30 will be discussed in detail. The non-skid floor mat 30 is formed of an elastomeric material 32 having an outer perimeter 34 shaped to conform with the floor 16 of the passenger compartment 10. The floor mate 30 has the advantages of which are discussed in further detail herein below, but may also be formed of alternate materials. The non-skid floor mat 30 may include a steering wheel aperture 36, a brake pedal aperture 38, and an accelerator pedal aperture 40. A series of attachment apertures 42 are positioned about the perimeter 34 for enabling fixed attachment of the non-skid floor mat 30 to the floor 16.

The non-skid floor mat 30 further includes a first section 44 having a flat surface 46 and a second section 48 having a flat surface 50 with a plurality of protrusions, or nibs 52, extending upward therefrom. It is anticipated, however, that the flat surfaces 46, 50 are textured of either or both of the first and second sections 44, 48 may be rough, or otherwise textured. As best seen in FIG. 3A, the nibs 52 are generally semi-spherical in form with a sufficient radius. However, it is anticipated that the nibs 52 may take any one of a number of forms including, but not limited to, conical, frusto-conical, pyramid, truncated, cylindrical and the like at the bottom. As discussed in further detail below, each nib 52 is formed to fit within recesses of a soft spike.

With particular reference to FIGS. 4 through 6, a typical soft spike 60 of a golf shoe is shown engaging the nibs 52 of the non-skid floor mat 30. Soft spike 60 described herein is one of a number of soft spike configurations known in the art. The soft spike 60 generally includes a conical body 62 having a threaded post 64 extending upward therefrom, for threaded attachment with a golf shoe sole 66. A series of ribs 68 extend downward from a conical face 70 of the soft spike 60, thereby forming recesses 72. As the soft spike 60 contacts the non-skid floor mat 30, the nibs 52 are received into the recesses 72 of the soft spike 60, as seen in FIGS. 5 and 6, and as shown in phantom in FIG. 4. In this manner, the non-skid floor mat 30 provides traction for the soft spikes 60, promoting passenger safety and comfort. It should further be noted that application of sufficient downward force through the soft spike 60 (e.g. when passenger is standing) enables the ribs 68 to contact the flat surface 50 between the nibs 52 concurrent to the nibs 52 engaging the recesses 72. In this manner, improved traction is provided.

As discussed briefly above, the nibs 52 are preferably semi-spherical in form for efficiently fitting within the recesses 72. However, it is anticipated that other forms of the nibs 52 would suffice to fit within the recesses 72 for providing traction. For example, as shown in FIG. 6, partially frusto-conical nibs 52 are one possibility. More importantly, however, the size and spacing of the nibs 52 must be appropriate for enabling sufficient engagement between the nibs 52 and soft spike 60, provide clearance to prevent a tripping hazard, and providing clearance for cleanability. Additionally, spacing of the nibs 52 must be appropriate to enable hard spikes (not shown) to contact the flat surface 50. In this manner, the non-skid floor mat 30 provides traction for both hard spike and soft spike golf shoes.

To that end, the nibs 52 have a center-to center distance no greater than 0.80 inches. The center-to-center distance ensures that at least two nibs 52, and optionally four nibs 52, engage the recesses 72 of the soft spike 60. Additionally, the center-to-center distance ensures that a hard spike may pass between the nibs 52 for contacting the flat surface 50, as well as enabling easy cleaning of the non-skid floor mat 30. For example, if the nibs 52 were positioned too close together it would be difficult to remove dirt and debris deposited therebetween.

Further, the nibs 52 preferably have a height within the range of 0.12 to 0.19 inches. This height range ensures that there is adequate engagement between the soft spike recesses 72 and the nibs 52. If the nibs 52 are too low, the non-skid floor mat 30 would fail to provide adequate traction. On the other hand, if the nibs 52 are too high, a soft spike may not move smoothly over the enon0skid floor mater 30. Similarly to the center-to-center distance, the height of the nibs 52 influences the cleanability of the non-skid floor mat 30. If the nibs 52 are too high, removal of dirt and debris from between the nibs 52 is hindered. Both the height and spacing of the nibs 52 are limited to prevent grabbing of the passenger's golf shoe.

As mentioned above, the non-skid floor mat 30 is formed using an elastomer component. The elastomeric material 32 provides toughness and wear resistance to extend the service life of the non-skid floor mat 30. As an elastomer, the non-skid floor mat 30 is resilient and deformable for enabling improved traction. In the case of a hard spike, the tip of the hard spike may engage the flat surface 50 between the nibs, thereby gripping the non-skid floor mat 30 to provide traction for the passenger. If, however, the hard spike contacts a nib 52, the hard spike can similarly project into the nib 52, providing traction regardless of whether direct contact with the flat surface 50 is achieved. With regard to a typical soft spike 60, as the recesses 72 engage the nibs 52, the nibs 52 are able to slightly deform under the applied force of the passenger, thereby increasing the contact surface between the soft spikes 60 and the nibs 52, thus increasing the traction. Additionally, nib deformation enables the soft spike 60 to engage the nibs 52 and concurrently contact the flat surface 50.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A non-skid floor mat of a golf car to enable traction with one of a hard spike and a soft spike of a golf shoe, comprising:

a sheet of resilient material; and a plurality of nibs in spaced relation to one another and protruding from said sheet, each of said nibs having an equal height that enables direct contact of the hard spike with said sheet and direct contact of the soft spike with at least one of said nibs and said sheet.

2. The non-skid floor mat of claim 1, wherein said sheet includes a textured surface disposed between said spaced nibs engaging the hard spike to provide traction and partially engaging the soft spike to provide traction.

3. A non-skid floor mat of a golf car to enable traction with one of a hard spike and a soft spike of a golf shoe, comprising:

a sheet having a first surface portion with a plurality of nibs in spaced relation to one another and protruding from said first surface portion and a second surface portion with no nibs thereon, each of said nibs having an equal height that enables direct contact of the hard spike with said sheet and direct contact of the soft spike with at least one of said nibs and said sheet.

4. The non-skid floor mat of claim 3, wherein said second surface portion with no nibs thereon includes a textured surface that engages the hard spike to provide traction and that partially engages the soft spike to provide traction.

5. The non-skid floor mat of claim 3, wherein said first surface portion includes a textured surface disposed between said plurality of spaced nibs engaging the hard spike to provide traction and partially engaging the soft spike to provide traction.

6. A non-skid floor mat of a golf car to enable traction with one of a hard spike and a soft spike of a golf shoe, comprising:

a sheet including a plurality of nibs in spaced relation to one another and protruding from said sheet, each of said nibs having an equal height, and having a given center to center distance between given spaced nibs that enables direct contact of the hard spike with a surface of said sheet between the nibs, and direct contact of the soft spike with said nibs and said surface of said sheet between said nibs.

7. The non-skid floor mat of claim 6, wherein a portion of said sheet has no nibs thereon and includes a textured surface.

8. The non-skid floor mat of claim 6, wherein said surface of said sheet between said nibs is textured.

9. The non-skid floor mat of claim 6, wherein said nibs have a height of less than or equal to 0.19 inches.

10. The non-skid floor mat of claim 6, wherein said nibs are offset from one another by a center to center distance of at least 0.5 inches.

11. The non-skid floor mat of claim 6, wherein said sheet is composed of elastomeric material.

12. The non-skid floor mat of claim 6, wherein said nibs have a height of at least 0.12 inches.

13. The non-skid floor mat of claim 6, further comprising a brake pedal aperture and an accelerator pedal aperture.

14. The non-skid floor mat of claim 6, further comprising a steering wheel aperture.

15. A non-skid floor mat of a golf car to enable traction with one of a hard spike and a soft spike of a golf shoe, comprising:

a sheet of elastomeric material; and a plurality of nibs in spaced relation to one another and protruding from said sheet, each of said nibs having an equal height, and having a given center to center distance between given spaced nibs that enables direct contact of the hard spike with a surface of said sheet between the nibs, and direct contact of the soft spike with said nibs and said surface of said sheet between said nibs.

16. The non-skid floor mat of claim 15, wherein said nibs have a height of less than or equal to 0.19 inches.

17. The non-skid floor mat of claim 15, wherein said nibs are offset from one another by a center to center distance of at least 0.5 inches.

18. The non-skid floor mat of claim 17, wherein said nibs are offset from one another by a center to center distance of less than 0.8 inches.

19. The non-skid floor mat of claim 15, wherein said nibs have a height of at least 0.12 inches.

20. The non-skid floor mat of claim 15, wherein said surface of said sheet between given spaced nibs is textured.

21. The non-skid floor mat of claim 15, further comprising a brake pedal aperture and an accelerator pedal aperture.

22. The non-skid floor mat of claim 15, further comprising a steering wheel aperture.

23. A non-skid floor mat of a golf car to enable traction with one of a hard spike and a soft spike of a golf shoe, comprising:

a sheet of elastomeric material, wherein a portion of said sheet includes a plurality of equal height nibs in spaced relation to one another and protruding therefrom, said nibs having a given center to center distance between given spaced ribs that enables direct contact of the hard spike with a surface of said sheet between the nibs and direct contact of the soft spike with said nibs and direct contact of said sheet between said nibs, and wherein said surface of said sheet between said nibs is textured for engaging the hard spike to provide traction and for partially engaging the soft spike to provide traction.

24. A golf car, comprising:

a floor;

a non-skid floor mat on said floor to enable traction with one of a hard spike and a soft spike of a golf shoe, said non-skid floor mat including:

a sheet; and a plurality of nibs in spaced relation to one another and protruding from said sheet, each of said nibs having an equal height, and having a center to center distance between given spaced nibs that enables direct contact of the hard spike with a surface of said sheet between the nibs, and direct contact of the soft spike with said nibs and said surface of said sheet between said nibs.

25. The golf car of claim 24, wherein said nibs have a height of less than or equal to 0.19 inches.

26. The golf car of claim 24, wherein said nibs are offset from one another by a center to center distance of at least 0.5 inches.

27. The golf car of claim 24, wherein said sheet is composed of an elastomeric material.

28. The golf car of claim 24, wherein said nibs have a height of at least 0.12 inches.

29. The golf car of claim 24, wherein said surface of said sheet between said plurality of nibs is textured.

30. The golf car of claim 24, further comprising a brake pedal aperture and an accelerator pedal aperture.

31. The golf car of claim 24, further comprising a steering wheel aperture.

* * * * *

UNITED STATES PATENT AND TRADEMARK OFFICE
CERTIFICATE OF CORRECTION

PATENT NO. : 6,933,036 B2
DATED : August 23, 2005
INVENTOR(S) : Jessie G. Whitaker It is certified that error appears in the above-identified patent and that said Letters Patent is hereby corrected as shown below:

Title page,
Item [75], Inventors, "Martinez, GA" should be -- Augusta, GA --.

Column 2,
Line 43, "mate 30" should be -- mat 30 --.
Line 55, "textured of" should be -- textured, --.

Column 3,
Line 31, "center-to center" should be -- center-to-center --.
Lines 47-48, "enon0skid floor mater 30" should be -- non-skid floor mat 30 --.

Column 4,
Line 61, after "of" insert -- an --.

Signed and Sealed this

Twentieth Day of December, 2005

JON W. DUDAS
*Director of the United States Patent and Trademark Office*